United States Patent [19]

Bills

[11] 4,103,940
[45] Aug. 1, 1978

[54] BRANCH FITTING FOR A PIPE
[75] Inventor: Franklin Deloy Bills, Elkhart, Ind.
[73] Assignee: Elkhart Products Corporation, Elkhart, Ind.
[21] Appl. No.: 755,816
[22] Filed: Dec. 30, 1976
[51] Int. Cl.² ............................................. F16L 41/00
[52] U.S. Cl. ................................. 285/189; 285/197; 285/286
[58] Field of Search ............... 285/197, 198, 199, 189, 285/286, 132

[56] References Cited

U.S. PATENT DOCUMENTS

| | | | |
|---|---|---|---|
| 2,015,246 | 9/1935 | Taylor | 285/189 |
| 3,214,199 | 10/1965 | Brooks | 285/189 |
| 3,497,245 | 2/1970 | Metzger | 285/150 |
| 3,649,055 | 3/1972 | Nilsen | 285/197 |
| 3,940,168 | 2/1976 | Balon | 285/132 |
| 3,971,500 | 7/1976 | Kushner et al. | 285/287 |

FOREIGN PATENT DOCUMENTS 527,182  5/1955  Italy .......................................... 285/222

Primary Examiner—Dave W. Arola
Attorney, Agent, or Firm—Tilton, Fallon, Lungmus & Chestnut

[57] ABSTRACT

A branch fitting for permanent attachment to the periphery of a pipe including a tubular portion having an inner diameter less than or the same as the inner diameter of the pipe, a saddle portion surrounding and extending outwardly and downwardly from the base of the tubular portion and having its under surface generally conforming to the outer surface of the pipe, and positive alignment means integral with the fitting at the junction of the saddle portion and the tubular portion whereby the fitting is self-aligning and self-jigging relative to an opening in the pipe.

2 Claims, 6 Drawing Figures

U.S. Patent  Aug. 1, 1978  4,103,940
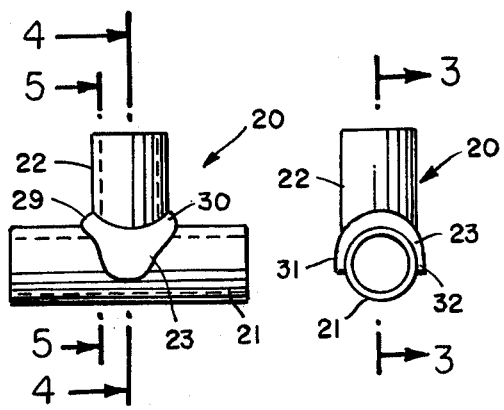
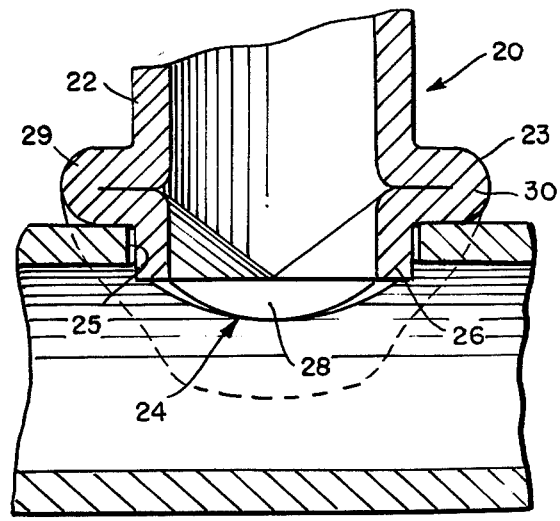
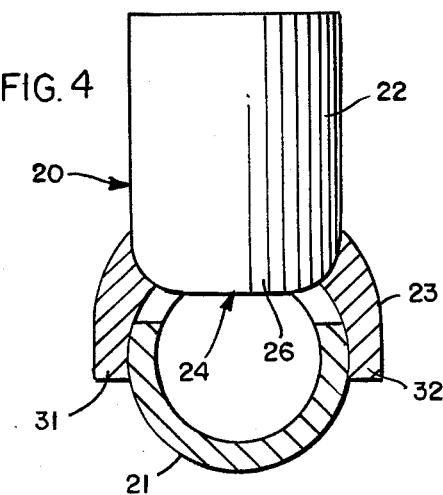
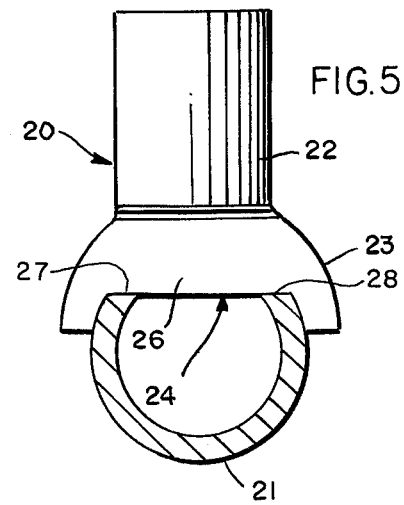
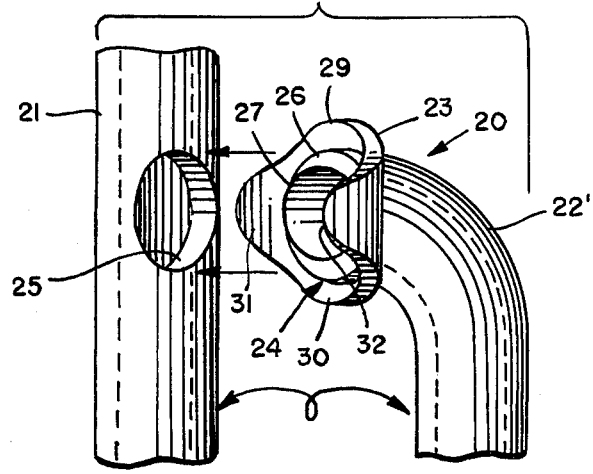

BRANCH FITTING FOR A PIPE

BACKGROUND AND SUMMARY OF INVENTION

This invention relates to a branch fitting for a pipe and, more particularly, to a branch fitting having positive alignment means for self-alignment and self-jigging of the fitting relative to an opening in the pipe.

Branch fittings of the type contemplated by the invention are used in a wide variety of fluid conducting installations and provide an extremely advantageous return bend connection for equipment using coils (either for heating or cooling).

Inasmuch as the fittings (as well as the types of tubing to which they are attached) are of relatively small size, it is important that the interior walls of the fittings as well as the tubing be relatively smooth having a fairly uniform inside diameter so as not to restrict fluid flow. Additionally, because these fittings are often integrated into coil equipment and the like, as by brazing or other heat employing uniting operations, it is important that the fitting be permanently attached to the tubing so as to prevent internal flow restrictions even in size-for-size joints thereby providing full flow characteristics.

The invention herein is specifically directed to a branch fitting for permanent attachment to the periphery of a pipe having a tubular portion with an inner diameter less than or the same as the inner diameter of the pipe, a saddle portion surrounding and extending outwardly and downwardly from the base of the tubular portion and having its under surface generally conforming to the outer surface of the pipe, and positive alignment means integral with the fitting at the junction of the saddle portion and the tubular portion for self-alignment and self-jigging of the fitting relative to an opening in the pipe. It is notable that the provision of such a fitting prevents the formation of internal flow restrictions in the pipe or the fitting as the fitting is permanently attached to the pipe such as by brazing. The positive alignment means advantageously renders the fitting self-aligning and self-jigging in all planes in a manner which prevents any relative lateral, longitudinal, and rotational movement between the fitting and the pipe as the fitting is permanently attached to the pipe. It will also be seen that the positive alignment means is preferably in the form of an extended pilot projecting downwardly from the junction of the saddle portion and the tubular portion a maximum distance the same as or greater than the thickness of the pipe. The pilot is advantageously circumferentially interrupted at two diametrically opposed positions forming a coaxial extension of the tubular portion and having a diameter equal to the diameter of the tubular portion wherein the tubular portion adjacent the saddle portion can be coaxial with the opening in the pipe as the fitting is permanently attached to the pipe. It is further notable that the provision of such a fitting preferably includes the saddle portion extending downwardly below the center line of the pipe and including opposing ends that extend outwardly and opposing sides that extend outwardly and downwardly from the base of the tubular portion. With these and still additional features described in detail hereinafter, a branch fitting is provided having significant advantages over prior art fittings.

The problems associated with prior art fittings such as those illustrated in U.S. Pat. Nos. 1,908,821, 1,977,112 and 3,649,055 have been solved through the employment of positive alignment means integral with the fitting at the junction of the saddle portion and the tubular portion. I have found that by forming a downwardly projecting extended pilot it is possible to provide a fitting that is self-aligning and self-jigging relative to an opening in the pipe in a manner preventing the formation of internal flow restrictions in the pipe or the fitting as the fitting is permanently attached to the pipe. The prior art previously required the fitting to have an inner diameter smaller than the inner diameter of the pipe and even then encountering difficulties in permanent attachment since such fittings were neither self-aligning nor self-jigging requiring the relatively time consuming use of special jigs that are expensive to use and less than fully effective during brazing or other attachment procedures. I have further found that fittings heretofore used would oftentimes shift slightly as they were being permanently attached to a pipe resulting in an even greater restriction to flow through the smaller inner diameter fittings as well as a weaker joint caused by the fact that there would be brazing only at the ends. With the features of my invention, I provide a branch fitting for permanent attachment to the periphery of a pipe with fully unimpaired flow, self-alignment and self-jigging in a size-for-size joint that is at least as strong as the strength of the pipe and fitting components.

Other objects and advantages of the invention may be seen in details of the ensuing specification.

DETAILED DESCRIPTION

The invention is described in conjunction with the accompanying drawings in which —

FIG. 1 is a front elevational view of a branch fitting in accordance with the present invention which is illustrated attached to a segment of pipe;

FIG. 2 is an end elevational view of the branch fitting of FIG. 1;

FIG. 3 is a sectional view taken on the line 3—3 of FIG. 2 illustrating the positive alignment means of the branch fitting;

FIG. 4 is a sectional view taken on the line 4—4 of FIG. 1 illustrating the saddle portion and the tubular portion of the branch fitting;

FIG. 5 is a sectional view taken on the line 5—5 of FIG. 1 illustrating the positive alignment means of the branch fitting; and FIG. 6 is a perspective view illustrating the branch fitting of FIG. 1 being placed in position on the segment of pipe.

In the illustration given and with reference first to FIG. 1, the numeral 20 generally designates a branch fitting for permanent attachment to the periphery of a pipe 21 in accordance with the present invention. The fitting 20 includes a tubular portion 22, a saddle portion 23, and positive alignment means 24 (as shown in FIG. 3) integral with the fitting 20 at the junction of the saddle portion 23 and the tubular portion 22. The tubular portion 22 has an inner diameter less than or the same as the inner diameter of the pipe 21 so that the branch fitting 20 can, if desired, provide a size-for-size joint without flow restrictions. The saddle portion 23 surrounds and extends outwardly and downwardly from the base of the tubular portion 22 (as shown in FIG. 1) and has its under surface generally conforming to the outer surface of the pipe 21. With the positive alignment means 24, the saddle portion 23 and the tubular portion 22, the branch fitting 20 is self-aligning and self-jigging relative to an opening 25 in the pipe 21 in a manner preventing the formation of internal flow restrictions in the pipe 21 or the fitting 20 as the fitting 20 is permanently attached to the pipe 21.

The positive alignment means 24 preferably includes an extended pilot 26 projecting downwardly from the junction of the saddle portion 23 and the tubular portion 22 a maximum distance the same as or greater than the thickness of the pipe 21. It will be noted from FIGS. 3, 4 and 5, that the positive alignment means 24 renders the fitting 20 self-aligning and self-jigging in all planes in a manner which prevents any relative lateral, longitudinal and rotational movement, respectively, between the fitting 20 and the pipe 21 as the fitting 20 is permanently attached to the pipe 21. The positive alignment means 24 is further advantageously characterized by the pilot 26 forming a coaxial extension of the tubular portion 22 and having a diameter equal to the diameter of the tubular portion 22 — the pilot 26 being circumferentially interrupted (as shown in FIG. 6) at two diametrically opposed positions 27 and 28 and as seen in FIG. 5, the edges of the pilot 26 with define the interruptions 27 and 28 terminate flush with the outer surface of the pipe.

The tubular portion 22 adjacent the saddle portion 23 (as shown in FIG. 3) is preferably coaxial with the opening 25 in the pipe 21 as the fitting 20 is permanently attached to the pipe 21. It will be appreciated by those skilled in the art that the opening 25 in the pipe 21 can either be drilled or sheared although I have found a sheared opening to be preferable since there is less of a tendency to leave burrs that might otherwise render permanent attachment difficult or interfere with full, unimpaired flow. The tubular portion 22 advantageously terminates at its base in the saddle portion 23 which extends downwardly below the center line of the pipe 21 as the fitting 20 is permanently attached to the pipe 21.

The saddle portion or beaded saddle 23 includes opposing ends 29 and 30 (as shown in FIG. 3) extending outwardly from the base of the tubular portion 22 and opposing sides 31 and 32 (as shown in FIG. 4) extending outwardly and downwardly from the base of the tubular portion 22. The fitting 20 and the pipe 21 can be constructed of various materials known in the art which are bondable for permanent attachment, but, when they are constructed of metal, the fitting 20 can be permanently attached to the pipe 21 by brazing in which case the opposing ends 29 and 30 of the beaded saddle 23 (as shown in FIG. 3) preferably have a thickness double the thickness of the opposing sides 31 and 32 of the saddle 23 (as shown in FIG. 4). With all of the features described in detail hereinabove, I have achieved the objective of providing an improved branch fitting 20 for permanent attachment to the periphery of a pipe 21.

The branch fitting 20 makes possible a size-for-size joint, i.e., a joint connecting a fitting having an inner diameter equal to the inner diameter of a pipe, in which the strength of the joint is at least as great as the strength of the components of the fitting 20 and the pipe 21. It is notable that the fitting 20 is self-aligning and self-jigging in all planes in a manner which prevents any relative lateral, longitudinal and rotational movement between the fitting 20 and the pipe 21 while also eliminating the prior necessity for special jigs since the fitting 20 can be placed on the pipe in a manner that will maintain perfect alignment until the fitting 20 has been permanently attached to the pipe 21 as by brazing, bonding or other attachment means. The fitting 20 can be permanently attached to the pipe 21 (as shown in FIG. 6) in a manner preventing the formation of internal flow restrictions since the extended pilot 26 not only maintains perfect alignment between the fitting 20 and the pipe 21 but also tends to cooperate with the beaded saddle 23 to limit migration of sealing materials or other permanent attachment materials through the opening 25 into the pipe 21. While the positive alignment means 24 provides internal beading within the opening 25 in the pipe 21, the saddle portion or beaded saddle 23 provides not only saddling of the opening 25 in the pipe 21 but also clipping to the periphery of the pipe 21 since it extends downwardly and inwardly below the center line of the pipe 21 — the clipping, saddling, and beading all contributing to self-alignment and self-jigging of the fitting 20.

As indicated previously, the saddle portion 23 has its under surface generally conforming to the outer surface of the pipe 21. It is desirable in this respect to provide a minimum gap or clearance between the saddle portion 23 and the pipe 21 so that there will be good capillary action for flow of filler materials during brazing. The brazing process requires rather high temperatures of the order of 1000° to 1400° F. depending upon materials and it is important to provide sufficient corresponding surface areas between the saddle portion 23 and the pipe 21 especially where it is desirable for the strength of the joint to be at least as great as the strength of the fitting 20 and the pipe 21. It has been found advantageous in this respect to form the entire fitting 20 of a single integral tubing portion in order to maintain high structural integrity. However, I have found the advantages of my invention to also be highly useful with other applications in which a branch fitting is to be permanently attached to the periphery of a pipe.

While in the foregoing specification a detailed description of the invention has been set down for the purpose of explanation, many variations in the details herein given may be made by those skilled in the art without departing from the spirit and scope of the invention.

I claim:

1. A branch fitting for permanent attachment to the periphery of a pipe comprising a single tubular portion having an inner diameter the same as the inner diameter of said pipe, saddle portion means having its undersurface generally conforming to the outer surface of said pipe, said saddle portion means having opposing ends extending outwardly and opposing sides extending outwardly and downwardly from the base of said tubular portion, extended pilot means circumferentially interrupted at two diametrically opposed positions aligned with said sides, the edges of said pilot means defining the interrupted portions terminating flush with the outer surface of said pipe, said extended pilot means projecting downwardly from the junction of said saddle portion and said tubular portion for insertion into an opening in said pipe, and means for permanently attaching said branch fitting to the periphery of said pipe, said saddle portion means and said extending pilot means cooperating to prevent relative lateral, longitudinal and rotational movement of said fitting relative to said opening in said pipe prior to introduction of said permanent attachment means to assure a size-for-size joint having a strength at least as great as the strength of said branch fitting and said pipe, said opposing ends of said saddle portion means are formed with a thickness double the thickness of said opposing sides thereof.

2. The fitting of claim 1 in which said fitting and said pipe are metal and said permanent attachment means is brazing.

* * * * *